United States Patent
Poppe et al.

(10) Patent No.: US 10,465,088 B2
(45) Date of Patent: *Nov. 5, 2019

(54) PIGMENTED COATING AGENT AND COATINGS PRODUCED THEREFROM

(71) Applicant: BASF Coatings GmbH, Muenster (DE)

(72) Inventors: Andreas Poppe, Sendenhorst (DE); Norbert Loew, Neustadt a.d.Aisch (DE); Cathrin Corten, Unna (DE); Britta Schnieders, Meppen (DE); Wei Qiu Hu, Shanghai (CN)

(73) Assignee: BASF Coatings GmbH, Muenster (DE)

( * ) Notice: Subject to any disclaimer, the term of this patent is extended or adjusted under 35 U.S.C. 154(b) by 2 days.

This patent is subject to a terminal disclaimer.

(21) Appl. No.: 15/528,269

(22) PCT Filed: Nov. 20, 2015

(86) PCT No.: PCT/EP2015/077199
§ 371 (c)(1),
(2) Date: May 19, 2017

(87) PCT Pub. No.: WO2016/087229
PCT Pub. Date: Jun. 9, 2016

(65) Prior Publication Data
US 2017/0362457 A1    Dec. 21, 2017

(30) Foreign Application Priority Data

Dec. 2, 2014 (EP) .................................... 14195886

(51) Int. Cl.
| | |
|---|---|
| *C09D 133/08* | (2006.01) |
| *C08F 220/14* | (2006.01) |
| *C09D 133/06* | (2006.01) |
| *C09D 143/04* | (2006.01) |
| *C09D 7/61* | (2018.01) |
| *B05D 7/00* | (2006.01) |
| *C09D 133/12* | (2006.01) |
| *C09D 167/02* | (2006.01) |
| *C08F 220/12* | (2006.01) |

(52) U.S. Cl.
CPC .......... *C09D 133/08* (2013.01); *B05D 7/572* (2013.01); *C08F 220/12* (2013.01); *C08F 220/14* (2013.01); *C09D 7/61* (2018.01); *C09D 133/06* (2013.01); *C09D 133/12* (2013.01); *C09D 143/04* (2013.01); *C09D 167/02* (2013.01)

(58) Field of Classification Search
CPC ...... C09D 133/08; C09D 167/02; C09D 7/61; C09D 133/12; C09D 133/06; C09D 143/04; C08F 220/12; C08F 220/14; B05D 7/572
See application file for complete search history.

(56) References Cited

U.S. PATENT DOCUMENTS

| | | |
|---|---|---|
| 5,300,571 A | 4/1994 | Jung et al. |
| 5,723,516 A | 3/1998 | Bigham et al. |
| 5,886,125 A | 3/1999 | Huybrechts |
| 6,214,418 B1 | 4/2001 | Igarashi et al. |
| 6,362,301 B1 | 3/2002 | Bowe et al. |
| 6,410,147 B1 | 6/2002 | Chung et al. |
| 2003/0170468 A1 | 9/2003 | Paquet, Jr. et al. |
| 2008/0076868 A1 | 3/2008 | Green et al. |

FOREIGN PATENT DOCUMENTS

| | | |
|---|---|---|
| EP | 0 228 003 A1 | 7/1987 |
| EP | 0 185 568 B1 | 2/1989 |
| EP | 0 318 880 A2 | 6/1989 |
| EP | 0 173 491 B1 | 11/1989 |
| EP | 0 419 669 A1 | 4/1991 |

(Continued)

OTHER PUBLICATIONS

International Search Report and Written Opinion dated Dec. 23, 2015 in PCT/EP2015/077199.
International Preliminary Report on Patentability dated Jun. 15, 2017 in PCT/EP2015/077199 (with partial English translation).
Shiiki, et al., "Thermosetting resin composition for automobile topcoating materials", Database Chemical Abstract Service, XP002741579, Aug. 14, 1992, pp. 1-6 (with English Derwent abstract).

(Continued)

*Primary Examiner* — Francisco W Tschen
(74) *Attorney, Agent, or Firm* — Oblon, McClelland, Maier & Neustadt, L.L.P.

(57) ABSTRACT

The present invention relates to a solventborne, pigmented coating composition having a solids fraction of at least 35%, which comprises, based on the total amount of the coating composition, 0.1 to 1.5 wt % of at least one copolymer (A), where the copolymer (A) is obtainable by copolymerization of a mixture of olefinically unsaturated monomers (a) in at least one organic solvent, the mixture of monomers (a) to be polymerized consists of (a1) 10 to 60 mol % of at least one monomer of the formula (I) below

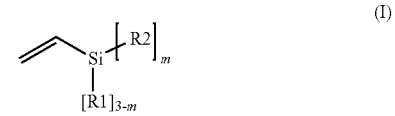

where
$R_1$=$C_1$ to $C_4$ alkoxy, $R_2$=$C_1$ to $C_4$ alkyl, and m=0 to 2, and also (a2) 40 to 90 mol % of at least one further olefinically unsaturated monomer, and the copolymer (A) possesses a glass transition temperature $T_g$ of at least −30° C. The present invention also relates to a method for producing a multicoat paint system using the coating composition, and to the multicoat paint systems themselves.

12 Claims, No Drawings

(56) References Cited

FOREIGN PATENT DOCUMENTS

| | | |
|---|---|---|
| EP | 0 787 159 B1 | 12/1998 |
| EP | 0 997 511 A1 | 5/2000 |
| EP | 1 092 757 A1 | 4/2001 |
| EP | 1 184 434 A2 | 3/2002 |
| JP | 58-171446 | 10/1983 |
| JP | 07-331165 | 12/1995 |
| RU | 2008 109 007 A | 9/2009 |
| RU | 2 428 519 C2 | 9/2010 |
| WO | WO 96/24619 | 8/1996 |
| WO | WO 99/42531 | 8/1999 |
| WO | WO 01/25307 A1 | 4/2001 |
| WO | WO 01/72909 A2 | 10/2001 |
| WO | WO 03/050194 A1 | 6/2003 |
| WO | WO 03/089477 A1 | 10/2003 |
| WO | WO 03/089487 A1 | 10/2003 |
| WO | WO 2006/063304 A1 | 6/2006 |

OTHER PUBLICATIONS

Xinguang Liu, "Organosilicon-containing vinyl copolymer coating and its preparation method", Database Chemical Abstract Service, XP002741578, Jun. 30, 2010, pp. 1-3.

Chen, et al., "Polyether-modified silicone-acrylate flexible resin-containing waterproof coating and its preparation", Database Chemical Abstract Service, XP002741577, Jun. 19, 2015, pp. 1-5.

PIGMENTED COATING AGENT AND COATINGS PRODUCED THEREFROM

CROSS REFERENCE TO RELATED APPLICATION

This application is a National Stage entry under 35 USC 371 of PCT/EP2015/077199, filed on Nov. 20, 2015, and claims priority to European Patent Application No. 14195886.8, filed on Dec. 2, 2014.

The present invention relates to a solventborne, pigmented coating composition comprising a specific copolymer (A), which is obtainable by copolymerizing a mixture of olefinically unsaturated monomers (a) in at least one organic solvent, the mixture of the monomers (a) comprising 10 to 60 mol % of at least one specific monomer (a1) having a vinylsilane group. The present invention relates, moreover, to a method for producing a multicoat coating system using the solventborne, pigmented coating composition, and also to the multicoat coating systems produced accordingly.

PRIOR ART

The known solventborne, pigmented coating compositions, particularly the so-called basecoat materials that are known in principle, are employed in the automobile industry, for example, for producing single-coat or multicoat color and/or effect coatings or paint systems. Multicoat paint systems where a clearcoat is applied over the basecoat, in particular, have good performance properties.

The continually growing demands of the market, particularly the demands of the automakers and their customers, however, are necessitating continual ongoing development of the technical and esthetic levels hitherto achieved.

As well as the technical and esthetic demands made on paint systems nowadays, however, the environmental profile of coating materials used in the production of paint systems, such as basecoat materials, for example, is also moving to center stage. A particular challenge is to reconcile the required performance properties of the paint systems with environmentally friendly production of these systems and/or of the coating compositions on which they are based.

One of the most relevant performance properties of pigmented coating compositions such as basecoat materials, and of coatings produced from them, for example, is the effective intercoat adhesion of the respective coating within the multicoat paint system. A particularly noteworthy quality is the adhesion of the basecoat film, not only, one the one hand, to substrates or coatings disposed below it, but also, on the other hand, to clearcoat films that are applied over it. Not only in the original finishing (OEM) of automobiles but also as part of automotive refinishing, the attainment of a satisfactory adhesion is an objective which is not always easy to attain. A particular problem here may be the adhesion between the original finish and the basecoat material that is used in the refinishing operation.

Likewise of high importance is the stonechip resistance of a multicoat paint system, this being the resistance of a paint system to stones which strike the surface of a paint system at high speed. The reason is that, in use, automobile paint systems are very intensively subjected particularly to such stone chipping.

A likewise relevant property of multicoat paint systems, and one which influences their mechanical resistance in particular, is the hardness of the multicoat construction. As well as the clearcoat film, for example, the underlying basecoat film also represents a relevant influencing factor in this context.

Even more challenging is the attainment of a balanced profile of properties, this being the simultaneous achievement of satisfactory results in terms of all of the properties required. The reason, of course, is that non-fulfillment even of just one specification means that the multicoat paint system in question fails overall to meet the requirements.

In the prior art there are numerous pigmented coating compositions known, particularly basecoat materials, that have good performance properties. Generally speaking, these coating compositions comprise a polymer as binder and a crosslinker. Crosslinkers used are frequently melamine resins, examples being monomeric crosslinking resins such as hexa(methoxymethyl)melamine (HMMM) or melamines with mixed etherification. The use of these crosslinkers in not inconsiderable quantities is a must in many cases for the attainment of good performance properties.

A problem here is that the use of such melamine resins is accompanied by a not inconsiderable environmental burden, because of the formaldehyde these resins contain. The environmental profile of these coating compositions, which has already been addressed, is therefore greatly in need of improvement.

An advantage, then, would be a pigmented coating composition for which it is possible at least in part, if not entirely, to do without the use of melamine resins, but which nevertheless has the required performance properties, more particularly an effective intercoat adhesion, stonechip resistance, and hardness. In that context, possible replacement components for melamine resins would be required on the one hand to be such as to be able likewise to meet the fundamental advantageous properties of the melamine resins. On the other hand, however, the nature and amount of such components would have to be selected such that, moreover, there are no adverse effects on other properties of a paint system. It is known indeed, that various components, depending on the nature and amount used, may result, for example, in incompatibilities, which may ultimately bring with them a negative pattern of properties. It would be even more advantageous if the starting materials used for producing the replacement components were readily accessible and obtainable at favorable cost. In that way it would be possible to achieve environmental and economical objectives at one and the same time.

More advantageous, from the standpoints both of the environment and of economics, would be the possibility of formulating such a pigmented coating composition with a comparatively low fraction of organic solvents, the resulting composition having, in other words, a low VOC (volatile organic content). Accordingly, the production of such multicoat paint systems would occasion fewer VOC emissions, and so production would be made more eco-friendly. A lowering of the VOC is achievable in particular through an increase in the solids content of the respective coating compositions.

Nowadays, in the production, for example, of multicoat paint systems as part of the known wet-on-wet method (in which, for example, following initial application of a pigmented basecoat material and a brief time for flash-off of this coating material, without a baking step, a clearcoat material is applied over the basecoat, and only then are the paint films jointly baked), the switch from medium-solids basecoat systems, with a solids fraction between 20-30%, to so-called high-solids basecoat systems, with a solids fraction greater than 35% in the application-ready state (spray viscosity), is achieving a significant VOC reduction within the processing operation. Increasing the solids content by only about 3% to 5% in the context of industrial painting operations is enough on its own to achieve massive savings in terms of organic solvents, which must absolutely be used and which are therefore emitted to the environment on processing.

A pigmented coating composition as stated above would be capable, therefore, of uniting the required performance properties of the paint systems produced therefrom with a more eco-friendly and more economical production of the paint systems.

U.S. Pat. No. 5,886,125 discloses clearcoat materials comprising a polymer which is prepared using a monomer containing vinylsilane groups. The copolymer is prepared in organic solvents. In coating compositions such as clearcoat materials, it is used alongside crosslinking agents such as melamine resins as principal binder.

US 2003/0170468 A1 discloses clearcoat materials likewise comprising a copolymer which is prepared using a monomer with vinylsilane function in organic solvents. The clearcoat materials comprise the preferably hydroxy-functional copolymer as principal binder. Additionally present, as crosslinker, is a melamine resin, in particular.

EP 0419669 A1 and EP 0318880 A1 disclose a silanized copolymer and its use in coating compositions. The coating composition is used explicitly for producing pigmented topcoats. The coating composition comprises the copolymer alongside a hydroxy-functional resin as principal binder.

Problem

The problem addressed with the present invention, accordingly, was that of providing a solventborne, pigmented coating composition in which it is possible to do, partly or even entirely, without the use of melamine resins. Moreover, the coating composition thus adapted ought additionally to be compatible with a high solids content; in other words, the solventborne, pigmented coating composition ought to have a low VOC content that is a target for environmental reasons. At the same time, however, the use thereof for producing multicoat paint systems ought to lead to outstanding performance properties on the part of the multicoat paint system. More particularly it should be possible at the same time to achieve outstanding intercoat adhesion of the coat produced using the coating composition, good stonechip resistance, and high hardness on the part of the multicoat paint system. These properties ought to be achieved both in the field of OEM finishing and in the context of automotive refinishing.

Solution

It has been found that the problems identified above can be solved by a solventborne, pigmented coating composition having a solids fraction of at least 35%, which comprises, based on the total amount of the coating composition, 0.1 to 1.5 wt % of at least one copolymer (A), where the copolymer (A) is obtainable by copolymerization of a mixture of olefinically unsaturated monomers (a) in at least one organic solvent, the mixture of monomers (a) to be polymerized consists of (a1) 10 to 60 mol % of at least one monomer of the formula (I) below

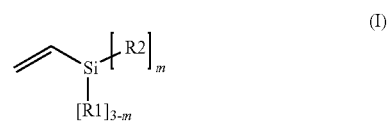

where
$R_1=C_1$ to $C_4$ alkoxy, $R_2=C_1$ to $C_4$ alkyl, and m=0 to 2, and also (a2) 40 to 90 mol % of at least one further olefinically unsaturated monomer, and the copolymer (A) possesses a glass transition temperature $T_g$ of at least $-30°$ C.

Consequently, the coating composition identified above is also referred to as coating composition of the invention and is, accordingly, subject matter of the present invention. Preferred embodiments of the coating composition of the invention are apparent from the description which follows on below, and also from the dependent claims.

A further subject of the present invention is a method for producing a paint system using the coating composition of the invention.

Subject matter of the present invention more particularly is a method for producing a multicoat paint system, by (1) applying at least one basecoat material to a substrate,
(2) forming a polymer film from the basecoat material applied in stage (1),
(3) applying at least one clearcoat material to the resulting basecoat film, and then
(4) curing the basecoat film together with the clearcoat material applied in stage (3), wherein a coating composition of the invention is used as basecoat material.

Additional subject matter of the present invention is a paint system, more particularly a multicoat paint system, produced by the method of the invention.

A further subject of the present invention is a substrate coated with a paint system, more particularly a multicoat paint system, of the invention.

Subject matter of the present invention not least is also the use of the coating composition of the invention for improving the mechanical properties of multicoat paint systems, particularly the intercoat adhesion, the stonechip resistance, and hardness of such multicoat paint systems.

It has been found that through the use of a specifically tailored amount of the copolymer (A), a pigmented coating composition is obtained which by virtue of the possible replacement of melamine resins and the resultant avoidance of formaldehyde emissions, has a significantly improved environmental profile and nevertheless, when used for producing paint systems, exhibits outstanding performance properties. The coating composition of the invention, moreover, has a high solids content, and is therefore even more advantageous from an environmental standpoint. A further finding is that the monomers of the formula (1) that are used in preparing the copolymer (A) are significantly more readily accessible and less expensive than other olefinically unsaturated monomers containing silane groups, an example being acryloyl- or methacryloyloxyalkylsilanes such as the frequently employed 3-methacryloyloxypropyltrimethoxysilane. In this way, performance quality is linked with environmental and economic advantages.

DESCRIPTION

Hereinafter, a description is given first of the multicoat paint system of the invention, and also of the method for producing it.

The multicoat paint systems of the invention are preferably constructed such that initially a primer has been applied to the substrate. Located over this primer is preferably at least one coat of a surfacer, and also at least one coat of a basecoat material, and, over that, at least one coat of a clearcoat material, with a clearcoat system or clearcoat film constituting the topmost coat of the multicoat paint system. With preference just one of the stated coating compositions is used. The individual coating films stated are preferably applied directly to one another. It is therefore preferred for one primer coat, one surfacer coat, one basecoat, and one clearcoat to be applied in each case directly to one another. The basecoat in this system is produced by using the coating composition of the invention—that is, the coating composition of the invention is preferably a basecoat material. It is, though, also possible for the surfacer coat to be produced by using the coating composition of the invention—for the coating composition of the invention, in other words, to be used as surfacer.

The coat system stated above is the coat system commonly used in the automotive finishing segment. The multicoat paint system of the invention, accordingly, is preferably a multicoat automobile paint system.

The names of the individual coats and coating compositions that have been selected are familiar in principle to the skilled person. Hence it is known, for example, that a surfacer or surfacer film serves primarily to protect against mechanical exposure such as stone chipping, for example, and also to fill unevennesses in the substrate. The basecoat film is primarily responsible for producing esthetic properties such as the color and/or effects such as the flop, and is generally disposed directly on the surfacer film.

Although a surfacer material and a basecoat material tend to have certain technical differences, owing to the stated profiles of requirements, a specific technical delimitation in this respect is neither necessary nor intended. It is entirely customary, for example, for a surfacer to have a significantly higher level of pigments, and more particularly of fillers, and also, consequently, a higher solids content, than a basecoat material. Depending on the individual application, however, these differences may also become more relative. For the purposes of the present invention, then, the terms are used merely for greater ease of comprehension. The critical factor is that a coating composition identified as a basecoat material, for example, exhibits the fundamental capacity to be used as a basecoat material.

It follows from what has been said above that as part of the method of the invention, application of the basecoat material is preceded preferably by the application of a primer and also of a surfacer to a substrate. Accordingly, the indication that a basecoat material is applied to a substrate (without the particularization "directly") does not automatically mean that the basecoat material is applied directly to the substrate and therefore there must be a direct contact between substrate and basecoat film. A direct contact of this kind exists automatically only if the application is particularized as being direct application.

The substrates are typically provided with a primer, in the case of metallic substrates, for example, with an electrocoat system, more particularly a cathodic electrocoat system. This system is applied with the customary methods such as electrodeposition coating, dipping, knifecoating, spraying, rolling, or the like. With preference the primer is at least partly or fully cured, more particularly fully cured, before surfacer, basecoat, and clearcoat are applied. The primer is cured typically by heating to a temperature between 80 and 170° C. for a time of 3 to 30 minutes.

The multicoat paint system of the invention is produced preferably on substrates made of metal and/or plastic, preferably of metal. These substrates may of course have been conversion-coated or otherwise pretreated. Hence metallic substrates are generally conversion-coated, more particularly phosphatized.

Applied atop the primer, then, is in particular at least one surfacer, at least one basecoat material, and at least one clearcoat material, preferably in each case just one of the stated coating compositions.

Surfacer, basecoat material, and clearcoat material are applied by means of customary methods for applying liquid coating compositions, such as dipping, knifecoating, spraying, rolling, or the like, for example, but more particularly by means of spraying. Preference is given to using spray application techniques, such as compressed air spraying, airless spraying, high-speed rotation, electrostatic spray application (ESTA), optionally in conjunction with hot spray application such as hot air (hot spraying), for example. Particularly advantageous is the application of a basecoat material by ESTA in a first application and pneumatically in a second application.

In a first preferred embodiment, the surfacer is cured at least partly or completely, preferably completely, before basecoat and clearcoat are applied. The surfacer is typically cured by heating to a temperature between 80 and 190° C. for a time of 2 to 30 minutes. The basecoat that is then applied is preferably flashed off briefly or dried briefly, generally at a temperature between 15 and less than 100° C. for a time of 1 to 15 minutes. After that the clearcoat is applied.

The applied basecoat and the applied clearcoat are then cured thermally, preferably jointly. Where, for example, the clearcoat is also curable by actinic radiation, there is an after cure by exposure to actinic radiation as well.

Curing may take place after a certain rest time. It may have a duration of 30 seconds to 2 hours, preferably 1 minute to 1 hour, and more particularly 1 to 45 minutes. The rest time serves, for example, for the leveling and for the devolatilization of the paint films, or for the evaporation of volatile constituents. The rest time may be shortened and/or assisted by the application of elevated temperatures of up to 90° C. and/or by a reduced humidity of less than 10 g water/kg air, provided this is not accompanied by any instances of damage or alteration to the paint films, such as premature crosslinking, for instance.

Joint curing takes place typically at a temperature between 90 and 160° C., preferably 100 to 150° C., for a time of 5 to 90 minutes.

The temperatures reported are understood in each case to be the actual temperatures of the coated substrate.

For the drying or conditioning of the wet basecoat system and also the wet clearcoat system, preference is given to using thermal and/or convection techniques, with customary and known apparatuses being employed, such as tunnel ovens, radiant NIR and IR heaters, blowers, and blowing tunnels. These devices may also be combined with one another.

In a further preferred embodiment, the surfacer as well is not cured separately, but is instead coated over with a basecoat material following the flashing-off or brief drying described above for the basecoat material. This is then followed in turn, as described above, by the application of the clearcoat material and, optionally after a rest time as described above, by the concluding curing of all three films together. With this system, referred to as "wet-on-wet-on-wet" application (also "3-wet", "3-coats-1-bake" or "3C1B"), therefore, one curing step is saved, by specific adaptation and tailoring of the coating compositions to one another, and hence a finishing operation is realized that is more economical overall. In this system, the surfacer, which is now no longer separately cured, is often also referred to as a functional layer by those in the art, for greater ease of comprehension. In this operation as well, the coating composition of the invention can be used outstandingly as basecoat material and optionally also as surfacer and/or as the coating composition that constitutes the functional layer.

In the multicoat paint systems of the invention, the basecoat generally has a dry film thickness of preferably 3 to 40 micrometers, especially preferably of 5 to 30 micrometers, and very preferably 7 to 25 micrometers. The clearcoat may have in general a dry film thickness of preferably 10 to 60 micrometers, more preferably up to 55 micrometers, more particularly up to 45 micrometers, very preferably up to 40 micrometers. Particularly preferred are ranges from 25 to 55 micrometers, more particularly from 30 to 45 micrometers, and very advantageously from 35 to 40 micrometers.

The primers, surfacers, and clearcoats that are used may be the coating compositions that are known in this context to the skilled person and that are generally available commercially. The clearcoat materials are preferably solventborne clearcoat materials. Preferred clearcoat materials are identified later on below, moreover.

Use of the coating composition of the invention is likewise outstandingly suitable for the refinish of multicoat paint systems, as for example inventive multicoat original (OEM) finishes on automobiles. This, then, is in particular a variant of the method of the invention for producing multicoat paint systems, in which the substrate used from stage (1) of the method is a multicoat paint system which possesses defect sites. Termed defect sites or film defects are, generally, perturbations on and in the coating, which are usually named for their shape or their appearance.

In the context of automobile finishing, where such defect sites occur directly after OEM finishing has taken place, they are repaired directly. Accordingly, the term "OEM automotive refinish painting" is also used. Where the defect sites to be repaired are only small, then just the so-called "spot" is repaired, rather than the entire body (double finishing). This procedure is called "spot repair". Also encompassed, however, as well as this form of refinish, of course, is the refinishing of multicoat paint systems which have been damaged in the course of the normal use of an automobile.

Defect sites in or on a multicoat paint system can be repaired using the method described above. For this purpose, the surface to be repaired on the multicoat paint system can first of all be abraded. This is followed by application of the coating composition of the invention as a basecoat material to the defect site in the original finish, by pneumatic atomization. After the basecoat material has been applied, it can be flashed or dried by known techniques. For example, the basecoat may be dried at room temperature for 1 to 60 minutes and subsequently dried at possibly slightly elevated temperatures of 30 to 80° C. After that, generally speaking, a commercially customary clearcoat material is applied, again by commonplace techniques. Following the application of the clearcoat material, it may be flashed at room temperature for 1 to 60 minutes, for example, and optionally dried. The clearcoat is then cured together with the applied pigmented basecoat, in particular in the manner already described above.

The coating composition of the invention is described below.

The coating composition of the invention comprises at least one specific copolymer (A). This copolymer (A) is obtainable or obtained by copolymerizing a mixture of olefinically unsaturated monomers (a) in at least one organic solvent.

Polymers or copolymers, conventionally, are always mixtures of molecules with different sizes, these molecules being distinguished by a sequence of identical or different organic monomer units (as the reacted form of organic monomers). Whereas a particular organic monomer can be assigned a discrete molecular mass, therefore, a polymer is always a mixture of molecules which differ in their molecular mass. Of course, therefore, a polymer, viewed as a mixture of different molecules, may always include some residual fractions of unreacted monomers, although such inclusion is generally disadvantageous—for reasons which will be stated further later on below—and attempts are therefore made to minimize such residual fractions.

Copolymers obtained by copolymerization of olefinically unsaturated monomers in organic solvents are known in principle. Examples of olefinically unsaturated monomers which can be used in principle for such a copolymerization include the conventional monoolefinically unsaturated monomers such as, in particular, (meth)acrylate-based monoolefinically unsaturated monomers, monoolefinically unsaturated monomers containing allyl groups, and other monoolefinically unsaturated monomers containing vinyl groups, such as vinylaromatic monomers, for example. For the purposes of the present invention, the term "(meth) acrylic" or "(meth)acrylate" encompasses both methacrylates and acrylates. The copolymerization of such monomers in typical organic solvents takes place generally with use of initiators, which are likewise known and are described in detail later on below, under the conditions that are customary and known in the field of polymer chemistry.

The mixture of olefinically unsaturated monomers (a) comprises at least one specific monomer (a1) of the formula (I) below.

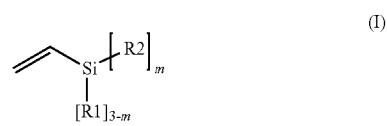

where
$R_1$=$C_1$ to $C_4$ alkoxy, preferably $C_1$ to $C_2$ alkoxy, especially preferably methoxy (=$C_1$ alkoxy), $R_2$=$C_1$ to $C_4$ alkyl, preferably $C_1$ to $C_2$ alkyl, especially preferably methyl (=$C_1$ alkyl), and m=0 to 2, preferably 0 or 1, especially preferably 0.

A particularly preferred monomer (a1), accordingly, is for example vinyltrimethoxysilane ($R_1$=methoxy, m=0).

The monomers (a1) therefore comprises at least one Si—O-alkyl bond (Si—$R_1$ bond) which is hydrolyzable by mechanisms known in principle to the skilled person. In this way it is possible, for example, for a copolymer (A) to be involved, by corresponding hydrolysis and condensation reactions, in crosslinking processes that occur in the course of the curing of a coating composition which comprises such a copolymer. The copolymers are able accordingly to contribute to advantageous properties such as, in particular, the intercoat adhesion, stonechip resistance, and hardness.

The fraction of the at least one monomer (a1), based on the total amount of the monomers (a) used for the copolymerization, is from 10 to 60 mol %, preferably from 11 to 50 mol %, especially preferably from 12 to 40 mol %, and more preferably 13 to 35 mol %.

When smaller amounts of the at least one monomer (a1) are used, evidently, only very small amounts of silane groups as described above are present, meaning that there is only minimal incorporation of the copolymer (A) into the processes of crosslinking and hence that no sufficient influence on the performance properties already described can be expected. If higher amounts of the monomer (a1) are used, there may be instances of incompatibility with other components within the coating composition, possibly resulting ultimately, in particular, in adverse effects on the esthetic properties of coatings produced from the coating compositions. Examples would include gel specks and/or hazing.

The mixture of olefinically unsaturated monomers (a) further comprises at least one further monomer (a2).

The selection of the at least one further olefinically unsaturated monomer (a2) is guided by the particular individual requirements of the case in hand. Restrictions on the selection of the at least one further olefinically unsaturated monomer arise ultimately from the fact that the copolymer (A) must have a glass transition temperature as described in detail later on below. In this sense, as is known, the monomers (a2) may be selected by a few directed experiments and/or by taking account of literature values as elucidated hereinafter.

Widely described in the literature are glass transition temperatures of homopolymers of a very wide variety of monomers. It is admittedly the case that the glass transition temperatures of such homopolymers are also dependent, as well as the selection of the monomer, to a small extent on other variables such as, for example, the molecular weight of the homopolymer. Nevertheless, the glass transition temperatures of different homopolymers of one and the same monomer move within a comparatively close range, meaning that the effect of adding a specific monomer to a mixture for polymerization on the glass transition temperature of the resulting copolymer can be derived simply and in a targeted way (in this regard, see also the known Fox equation, which correlates the nature and amount of the monomers used, via the glass transition temperature of the homopolymers in these monomers, with the glass transition temperature of the copolymer).

Reference may be made, by way of example, to homopolymers of methyl methacrylate and n-butyl acrylate. While the former, independently of other parameters or of the measurement technique selected, have a glass transition temperature of at any rate more than 100° C., glass transition temperatures of around −55° C. are described for the latter. If the skilled person has prepared a copolymer of a mixture of olefinically unsaturated monomers using at least one monomer of the formula (I), and if this copolymer possesses a glass transition temperature of 10° C. (the measurement technique to be employed in the context of the present invention is described later on below), then it is immediately clear to the skilled person how he or she is able, starting from this situation, to raise or lower the glass transition temperature. Increasing the fraction of methyl methacrylate in the mixture of olefinically unsaturated monomers would lead at any rate to a copolymer possessing a higher glass transition temperature. Increasing the fraction of n-butyl acrylate would result, correspondingly, in a lowering of the glass transition temperature. The precise glass transition temperature of a copolymer then prepared with a modified monomer mixture may then be determined, again, via the measurement technique which is described later on below and is to be employed in the context of the present invention.

The monomers (a2) are preferably monoolefinically unsaturated.

One preferred group of monomers (a2) are conventional, (meth)acrylic-based, monoolefinically unsaturated monomers (a21). Examples include (meth)acrylic acid and esters or amides of (meth)acrylic acid.

Especially preferred are esters of (meth)acrylic acid (a21), in other words monomers of the formula $H_2C{=}CH_2{-}(C{=}O){-}O{-}R_3$ or $H_2C{=}CH(CH_3){-}(C{=}O){-}O{-}R_3$, in which $R_3$ is a saturated aliphatic, an aromatic or a mixed saturated aliphatic/aromatic radical. $R_3$ is preferably saturated aliphatic. Aliphatic radicals for the purposes of the present invention are all organic radicals which are not aromatic.

The saturated aliphatic radical may be a pure hydrocarbon radical or it may contain bridging heteroatoms (examples being oxygen from ether groups or ester groups) and/or may be substituted by functional groups containing heteroatoms (alcohol groups, for example). The saturated aliphatic radical $R_3$ is preferably a pure hydrocarbon radical (alkyl radical), which therefore contains no bridging heteroatoms (oxygen from ether groups, for example) and which is not substituted by functional groups (alcohol groups, for example).

Where the radical $R_3$ is an alkyl radical, it may be a linear, branched, or cyclic alkyl radical. Such an alkyl radical, of course, may also have linear and cyclic moieties and/or branched and cyclic moieties. The alkyl radical preferably has 1 to 20, more preferably 1 to 10, carbon atoms.

Examples of these particularly preferred esters of (meth) acrylic acid with an alkyl radical $R_3$ include methyl (meth) acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-tri-methylhexyl (meth)acrylate, stearyl (meth)acrylate, lauryl (meth)acrylate, cycloalkyl (meth)acrylates, such as cyclopentyl (meth)acrylate, isobornyl (meth)acrylate, and also cyclohexyl (meth)acrylate. Compounds preferred among these are methyl methacrylate, n-butyl acrylate, and ethylhexyl acrylate.

Another preferred group of monomers (a2), which may also be used in combination with the above-described (meth) acrylate-based monomers (a21), are vinylically unsaturated and monounsaturated monomers (a22) of the formula $H_2C{=}CH_2{-}R_4$, which are different from the (meth)acrylate-based monomers (a21). The radical $R_4$ in that case of course contains no olefinically unsaturated groups. It may otherwise be selected as desired (although there cannot be a $-(C{=}O){-}O{-}$ function present in alpha-position to the vinyl function, since otherwise it would be a monomer (a21)).

The radical $R_4$ may accordingly be saturated aliphatic, aromatic, or mixed saturated aliphatic/aromatic. It is preferably saturated aliphatic. Possible in that case are radicals $R_4$ which comprise bridging heteroatoms and/or functional groups containing heteroatoms. Examples include ethers, amides, nitriles, heterocycles, and esters of the form $-O-(C{=}O){-}R_5$ (in which case $R_5$, by analogy with the above-described radical $R_3$ of the (meth)acrylate-based monomers, may again be a saturated aliphatic, aromatic, or mixed saturated aliphatic/aromatic radical). It is also possible of course for an aliphatic radical $R_4$ to be a pure hydrocarbon radical, in other words an alkyl radical, which is linear, branched, or cyclic. Such an alkyl radical may of course also have linear and cyclic moieties and/or branched and cyclic moieties.

Preferred monomers (a22) are those of the formula $H_2C=CH_2—R_4$ where $R_4=—O—(C=O)—R_5$, where $R_5$, in analogy to the above-described preferred radical $R_3$, is an alkyl radical having 1 to 20, more preferably 1 to 10, carbon atoms. Examples include vinyl acetate ($R_5$=methyl). Mention may likewise be made of the monomers available under the trade name VeoVa in which the radical $R_5$ has nine carbon atoms and possesses a quaternary carbon atom in alpha-position to the ester group. These monomers, which accordingly are branched, are preferred monomers (a22), just like vinyl acetate, on account solely of their ready availability.

In the context of the present invention it has emerged that the principal use of monomers (a2) that contain no functional groups which are able to enter into condensation reactions with the hydrolyzable Si—O-alkyl bonds (Si—$R_1$ bonds) of the monomers (a1) is of advantage. Such functional groups are known to the skilled person. Explicitly they include, in particular, hydroxyl groups, carboxylic acid groups, amino groups, and acid anhydride groups. Known in the prior art, for example, are copolymers produced using not only vinylsilane group-containing monomers but also significant quantities of olefinically unsaturated monomers containing hydroxyl groups or carboxylic acid groups. For the purposes of the present invention, however, it is preferred to forgo precisely such use. In that way, condensation processes between the silane groups (or the hydrolyzable Si—$R_1$ bonds) and the stated functional groups, hydroxyl groups for example, are minimized. This is so not only for preparation but also for the storage that then follows. As a result of the principal avoidance of such monomers, therefore, an improvement is obtained in particular in the storage stability of coating compositions which include such copolymers.

The olefinically unsaturated monomers (a2) used, accordingly, based on the total amount of these monomers (a2), comprise preferably at least 70 mol %, especially preferably at least 80 mol %, very preferably at least 95 mol % of monomers which are free from functional groups selected from the group consisting of hydroxyl groups, carboxylic acid groups, amino groups, and acid anhydride groups. In an especially preferred embodiment, use is made exclusively of monomers (a2) which are free from functional groups selected from the group consisting of hydroxyl groups, carboxylic acid groups, amino groups, and acid anhydride groups.

In the context of the present invention it has also been found that it is of advantage to make principal use of monomers (a2) which contain no aromatic groups. A particular effect of this is to achieve very largely complete conversion of the monomers employed in preparing copolymers (A), meaning that residual monomers remain only in minimal amounts, if at all. Such residual monomers can be removed in principle, if at all, only under costly and inconvenient conditions. If they are not removed, incompatibilities and migration events that are difficult to control may result in the coatings produced. The hazard to health posed by monomers which are given off in the course of storage or curing, for example, is another great disadvantage.

Consequently, the olefinically unsaturated monomers (a2) employed, based on the total amount of these monomers (a2), comprise preferably at least 70 mol %, especially preferably at least 80 mol %, very preferably at least 95 mol % of aliphatic monomers. In one especially preferred embodiment, aliphatic monomers (a2) are used exclusively.

It follows from what has been said above that for the purposes of the present invention, the monomers (a2) comprise preferably at least 70 mol %, especially preferably at least 80 mol %, very preferably at least 95 mol % of monomers which are selected from the group consisting of monomers of the formula $H_2C=CH_2—(C=O)—O—R_x$, $H_2C=CH(CH_3)—(C=O)—O—R_x$, and $H_2C=CH_2—O—(C=O)—R_x$, where $R_x$—in analogy to the above-described preferred radicals $R_3$ and $R_5$—is an alkyl radical having 1 to 20, more preferably 1 to 10, carbon atoms. In one especially preferred embodiment, such monomers (a2) are used exclusively.

Even more preferably, the monomers (a2) comprise preferably at least 70 mol %, especially preferably at least 80 mol %, very preferably at least 95 mol % of monomers which are selected from the group consisting of monomers of the formula $H_2C=CH_2—(C=O)—O—R_x$ and $H_2C=CH(CH_3)—(C=O)—O—R_x$ where $R_x$—in analogy to the above-described preferred radical $R_3$—is an alkyl radical having 1 to 20, more preferably 1 to 10, carbon atoms. In one especially preferred embodiment, such monomers (a2) are used exclusively.

An especially preferred composition of monomers (a2) consists for example of 20 to 80 mol % of methyl methacrylate and 20 to 80 mol % of n-butyl acrylate.

The fraction of the at least one monomer (a2), based on the total amount of the monomers (a) used for the copolymerization, is from 40 to 90 mol %, preferably from 50 to 89 mol %, especially preferably from 60 to 88 mol %, and more preferably 65 to 87 mol %.

The copolymers (A) possess a glass transition temperature $T_g$ of at least $-30°$ C., preferably $-25$ to $50°$ C., and especially preferably of $-15$ to $30°$ C. As described above, the glass transition temperature may be adjusted, in particular, by selection of the monomers to be polymerized and of their proportions—something which is possible in a targeted way—and hence realized in the target polymer. Too low a glass transition temperature of the copolymer would be detrimental to the performance properties of coatings produced by means of the coating composition of the invention. It would be possible, in particular, for adequate hardness to no longer be achieved in the coating.

For the purposes of the invention, experimentally, the glass transition temperature $T_g$ is determined in accordance with DIN 51005 "Thermal Analysis (TA)—Terms" and DIN 53765 "Thermal Analysis—Dynamic Scanning calorimetry (DSC)". Here, a sample of 15 mg is weighed out into a sample boat and introduced into a DSC instrument. It is cooled to the start temperature, after which $1^{st}$ and $2^{nd}$ measurement runs are carried out with a heating rate of 10 K/min under inert gas ($N_2$) blanketing of 50 ml/min, with cooling back down to the start temperature between the measurement runs. Measurement takes place customarily in the temperature range from about $50°$ C. lower than the anticipated glass transition temperature to about $50°$ C. higher than the glass transition temperature. The glass transition temperature for the purposes of the present invention, in accordance with DIN 53765, section 8.1, is the temperature in the $2^{nd}$ measurement run at which half of the change in the specific heat capacity (0.5 delta $c_p$) is reached. It is determined from the DSC diagram (plot of the thermal flux against the temperature). It is the temperature which corresponds to the point of intersection of the center line between the extrapolated baselines before and after the glass transition, and the measurement plot.

Where reference is made in the context of the present invention to a standard, such as a DIN standard, the reference is to the version of the standard that is valid at the time of filing or, if there is no longer a valid version at the time of filing, to the most recently valid version of the standard.

The number-average molecular weight $M_n$ of the copolymers (A) is typically in the range from 1000 to 30 000 g/mol, preferably 1100 to 15 000 g/mol, especially preferably 1200 to 5000 g/mol. The weight-average molecular weight $M_w$ of the copolymers (A), in contrast, is typically in the range from 2000 to 50 000 g/mol, preferably 2500 to 25 000 g/mol, especially preferably 3000 to 15 000 g/mol.

In the context of the present invention, the average molecular weights are determined by means of gel permeation chromatography at 40° C. with a high-pressure liquid chromatography pump and a refractive index detector. The eluent used was tetrahydrofuran with an elution rate of 1 ml/min; the column material is styrene-divinylbenzene-based. Calibration is carried out using polystyrene standards.

The copolymers (A) are prepared in organic solvents and may be prepared under copolymerization conditions which are known in principle—that is, in particular, at temperatures of 50 to 200° C., for example, under atmospheric or superatmospheric pressure, in typical apparatus such as stirred tanks, tube reactors, loop reactors, or Taylor reactors, and using typical radical initiators.

Examples of suitable organic solvents are in particular those which are chemically inert toward the monomers (a) and which do not react with these monomers even under typical polymerization conditions. The skilled person knows how to select such solvents. Examples of such solvents are aliphatic and/or aromatic hydrocarbons and also typical commercially available solvent mixtures such as toluene, xylene, solvent naptha, Solvesso 100, Hydrosol® (from ARAL), Shellsol®, ketones, such as acetone, methyl ethyl ketone, or methyl amyl ketone, esters, such as ethyl acetate, butyl acetate, butyl glycol acetate, pentyl acetate, or ethyl ethoxy propionate, ethers, or mixtures of the aforementioned solvents. Preference is given to using only small amounts (less than 5 wt %, based on the total amount of solvents), and more particularly no organic protic solvents at all. This prevents typical secondary reactions of the solvents with, in particular, the hydrolyzable Si—$R_1$ functions of the monomers (a1).

Examples of suitable radical initiators are dialkyl peroxides, such as di-tert-butyl peroxide or dicumyl peroxide, hydroperoxides, such as cumene hydroperoxide or tert-butyl hydroperoxide, peresters, such as tert-butyl perbenzoate, tert-butyl perpivalate, tert-butyl per-3,5,5-trimethylhexanoate, or tert-butyl per-2-ethylhexanoate, peroxodicarbonates, potassium, sodium, or ammonium peroxodisulfate, azo initiators, examples being azodinitriles such as azobisisobutyronitrile, C—C-cleaving initiators such as benzopinacol silyl ethers, or a combination of a nonoxidizing initiator with hydrogen peroxide. Combinations of the initiators described above may also be used. The amount of initiators used is preferably from 3 to 8 mol %, based on the molar amount of the monomers (a) employed.

In the copolymerization it is preferred to operate in the absence of oxygen (inert gas atmosphere), preferably in a stream of nitrogen. The copolymerization takes place preferably at a temperature of 80 to 200° C., especially preferably 120 to 160° C. In particular at these high temperatures it is possible for the monomers used, especially the monomers (a1), to volatilize under atmospheric pressure, or for the temperature at atmospheric pressure to exceed their boiling point. It is therefore preferred, for the purposes of the present invention, to carry out the copolymerization under superatmospheric pressure, more particularly at a pressure of 2.0 to 5.0 bar, preferably 3.0 to 4.0 bar. It is therefore preferred that the copolymerization is carried out at a temperature of 80 to 200° C. and at a pressure of 2.0 to 5.0 bar, especially preferably at a temperature of 120 to 160° C. and at a pressure of 3.0 to 4.0 bar.

The preparation procedure is preferably as follows. An organic solvent is introduced initially in an inert gas atmosphere and is heated to the desired copolymerization temperature. Then the initiator feed is commenced dropwise, before, after a minimum amount of initiator has been reached (typically at least 3 mol % of the total initiator employed), the dropwise feeding of the premixed monomers (a) is commenced. Following complete addition of the monomers (a), there may be further addition of initiator, in order to ensure complete or near-complete conversion of the monomers (a). Where the amount of initiator used or a fraction thereof is specified in the context of the present invention, this always refers to the added initiator as a whole, in other words, for example, to the initiator added before, during, and after complete addition of the monomers.

It is therefore of advantage that the monomers (a1) and (a2) used for the polymerization are used in fully premixed form in the polymerization, in other words being contacted in fully premixed form with the initiator at the desired copolymerization temperature. In this embodiment, therefore, in particular no monomers are introduced initially and then mixed with the remaining monomers and with the initiator. This prevents a systematic deviation between the ratios of the monomers used in principle and the ratios of the monomers during the copolymerization.

The amount of the copolymers (A) in the coating composition of the invention is 0.1 to 1.5 wt %, preferably 0.15 to 1.25 wt %, more preferably 0.2 to 1.0 wt %, and more particularly 0.3 to 0.75 wt %, based in each case on the total amount of the coating composition of the invention. Complying with this range is essential to the invention. At lower proportions in the coating composition, no advantageous effect is achieved any longer on the performance properties of coatings, and in particular no effective intercoat adhesion and stonechip resistance are achieved. Surprisingly it has emerged that a higher amount of the copolymer leads in turn to poorer performance properties, more particularly to no longer sufficient stonechip resistance and intercoat adhesion in the area of refinishing.

In the case of a possible particularization to coating compositions comprising preferred copolymers (A) in a defined proportional range, the following applies: The copolymers (A) which do not fall within the preferred group may of course still be present in the coating composition. The defined proportional range then applies only in respect of the preferred group of copolymers (A). It is preferred, however, that the defined proportional range also applies for the entire fraction of copolymers (A), consisting of copolymers from the preferred group and copolymers (A) which do not fall within the preferred group.

If, then, there were to be a restriction to a proportional range of 0.2 to 0.75 wt % for a preferred group of copolymers (A), this proportional range would obviously apply initially only to the preferred group of copolymers. In that case, however, it would be preferred for there likewise to be 0.2 to 0.75 wt % of all the originally comprised copolymers (A), consisting of copolymers (A) from the preferred group and of copolymers (A) which do not fall within the preferred group. If, therefore, 0.4 wt % of copolymers (A) of the preferred group is used, it is possible for not more than 0.35 wt % of copolymers (A) of the nonpreferred group to be used.

In the case of a particularization as described, it is preferred for the respectively preferred copolymers (A) to account for at least 50 mol %, preferably at least 80 mol %, more particularly 100 mol % of the copolymers (A) contained overall.

For the purposes of the present invention, the stated principle applies in respect of all stated components of the coating composition and their proportional ranges—for the pigments, for example.

The coating composition of the invention is pigmented and accordingly comprises at least one pigment. Pigments, as is known, are colorants in powder and/or platelet form which are used commonly in coating compositions.

The pigment is preferably selected from the group consisting of organic and inorganic, preferably inorganic, color-imparting, effect-imparting, color and effect-imparting, magnetic shielding, electrically conductive, corrosion-inhibiting, fluorescent, and phosphorescent pigments. The color and/or effect pigments are used with preference.

With particular preference the pigmented coating composition of the invention comprises at least one effect pigment, preferably at least one metal flake pigment. Besides the effect pigment or pigments, the pigmented coating composition of the invention may also further comprise at least one or more other pigments, examples being color pigments.

Examples of suitable effect pigments, which may also impart color, are metal flake pigments, more particularly aluminum flake pigments, such as commercial stainless steel bronzes, more particularly commercial aluminum bronzes, and also nonmetallic effect pigments, such as pearlescent and interference pigments, and platelet-shaped effect pigments based on iron oxide, or liquid-crystalline effect pigments, for example. For further details, refer to Rompp Lexikon Lacke and Druckfarben, page 176, entry heading "Effect pigments" and pages 380 and 381, entry headings "Metal oxide-mica pigments" to "Metal pigments".

Use is made more particularly of aluminum bronzes or aluminum flake pigments, in the form of pastes with organic solvents, for example. Use in this case is made both of untreated types, which are available commercially under the name Stapa® Metallux (from Eckart), for example, and of treated types, more particularly silanized types, which are described in WO 01/81483, for example, and are available commercially, for example, under the name Hydrolan® (from Eckart).

The metal flake pigment preferably has an average particle size of 10 to 70 and more particularly of 13 to 35 micrometers (D50, ISO 13320-1 according to Cilas (instrument 1064)). Metal flake pigments of this kind have a thickness of preferably 200 to 2000 nm and more particularly 500 to 1500 nm (measured using a scanning electron microscope). Through the two analytical methods, the geometric parameters of the particles are adequately defined, with the measurement of the average particle size reflecting more the diameter of the flakes.

Suitable organic and/or inorganic color pigments are the pigments that are customarily employed in the paints and coatings industry. Examples of suitable inorganic color pigments are white pigments such as titanium dioxide, zinc white, zinc sulfide, or lithopone; black pigments such as carbon black, iron manganese black, or spinel black; chromatic pigments such as chromium oxide, chromium oxide hydrate green, cobalt green or ultramarine green, cobalt blue, ultramarine blue, or manganese blue, ultramarine violet or cobalt violet and manganese violet, red iron oxide, cadmium sulfoselenide, molybdate red, or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate.

Examples of suitable organic color pigments are monoazo pigments, diazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

The amount of the pigments may vary very widely and is guided primarily by the depth of color and/or the intensity of the effect to be established, and also by the dispersibility of the pigments in the pigmented coating compositions of the invention. The fraction of pigments is preferably 0.5 to 40 wt %, especially preferably 0.5 to 30 wt %, very preferably 1 to 20 wt %, particularly advantageously 1.5 to 10 wt %, based in each case on the total weight of the coating composition.

The coating composition of the invention comprises, as a solventborne coating composition, at least one organic solvent.

Suitable solvents are all solvents commonly used within the paints and coatings industry, examples being alcohols, glycol ethers, esters, ether esters, and ketones, aliphatic and/or aromatic hydrocarbons, such as, for example, acetone, methyl isobutyl ketone, methyl ethyl ketone, butyl acetate, 3-butoxy-2-propanol, ethyl ethoxy propionate, butyl glycol, butyl glycol acetate, butanol, dipropylene glycol methyl ether, butyl glycolate, xylene, toluene, Shellsol® T, Pine Oil 90/95, Solventnaphtha®, Shellsol® A, Solvesso, Benzine 135/180. Preference is given to using only minor amounts (less than 5 wt %, based on the total amount of solvent), and more particularly none at all, of organic protic solvents. This prevents typical side reactions of the solvents with, in particular, the hydrolyzable Si—$R_1$ functions of the polymers (A).

The amount of organic solvents in the coating composition of the invention is, for example, not more than 65 wt %. The fraction is preferably 40 to 65 wt %, more preferably at least 45 wt %, more particularly at least 50 wt %, especially advantageously at least 55 wt %, based in each case on the total amount of the pigmented coating composition of the invention. Particularly preferred ranges are from 40 to 63 wt %, more particularly 45 to 63 wt %, very preferably 50 to 63 wt %, and very advantageously 55 to 63 wt %, based in each case on the total amount of the pigmented coating composition of the invention. The preferred ranges, more particularly the upper limits, are recognizable from the fact that the coating composition of the invention preferably includes comparatively small fractions of organic solvents and therefore has a comparatively low VOC.

The coating composition of the invention is solventborne. Solventborne coating compositions are those which comprise as their solvent at least one organic solvent and in particular not water. This means that water is not added explicitly during the preparation of the coating composition; instead, water is carried in, for example, merely as a residual fraction or impurity in other ingredients present in the coating composition, as for example by residual fractions of water in organic solvents. More particularly, solventborne means that the coating composition comprises at least one organic solvent and that the water fraction is less than 2 wt %, preferably less than 1 wt %, based in each case on the total weight of the coating composition. Very preferably the coating composition is water-free.

In addition to the at least one copolymer (A), the coating composition of the invention preferably comprises at least one further polymer (B), different from the copolymers (A), and as binder.

Suitable further binders (B) are, for example, linear and/or branched and/or comb (co)polymers of ethylenically unsaturated monomers, or polyaddition resins and/or polycondensation resins, that are of random, alternating and/or blocklike construction.

Examples of suitable (co)polymers are (meth)acrylate (co)polymers or partially hydrolyzed polyvinyl esters, more particularly (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether polyurethanes, or polyester-polyether-polyurethanes.

The coating composition preferably comprises a hydroxy-functional polymer (B) as binder.

The pigmented coating composition of the invention preferably comprises at least one acrylate polymer, polyurethane polymer, and/or a polyester as further binder (B). Very preferably there is a polyester (B) included.

The polymers (B) as binders preferably comprise thio, hydroxyl, N-methylolamino, N-alkoxymethylamino, imino, carbamate, allophanate and/or carboxyl groups, preferably hydroxyl or carboxyl groups. Hydroxyl groups are especially preferred. Via these functional groups, more particularly the hydroxyl groups, crosslinking may then take place for example, with components which contain further functional groups such as, preferably, anhydride, carboxyl, epoxy, blocked isocyanate, urethane, siloxane, carbonate, amino, hydroxyl and/or beta-hydroxyalkylamide groups. In particular it is possible for a hydroxy-functional polymer (B) on curing to crosslink via the hydroxyl groups with the hydrolyzable Si—$R_1$ functions that are present in the copolymer (A).

The coating composition of the invention, then, is preferably curable thermally—in other words, by chemical reaction of the reactive functional groups described, it is possible for crosslinking to take place (formation of a coating film), with the energetic activation of this chemical reaction being possible through thermal energy. Very preferably, here, the aforementioned crosslinking of the at least one copolymer (A) takes place via the hydrolyzable Si—$R_1$ functions with hydroxyl groups of the binder (B); in other words, the coating composition of the invention is then thermally curable and externally crosslinking.

External crosslinking exists, then, when a polymer containing certain functional groups is reacted with an agent which is different from it and is optionally likewise polymeric, this agent being referred to as a crosslinking agent, the crosslinking agent then containing reactive functional groups which are complementary to the reactive functional groups present in the organic polymer employed. In this respect, for example, the copolymer (A) may be termed a crosslinking agent, which crosslinks via the hydrolyzable Si—$R_1$ functions with the hydroxy-functional polymer (B). Both components are of course binder components, since they belong to the nonvolatile fraction of the coating composition without pigments and fillers. As is known, however, for the sake of ease of comprehension alone, one of the components is generally referred to as the crosslinking agent.

It is of course also possible for other components to be present that are generally referred to by the skilled person as crosslinking agents. Examples include free and blocked polyisocyanates and also melamine resins. These components can then also crosslink with the hydroxy-functional polymers (B).

A particular advantage of the present invention, however, is that through the use of the copolymers (A) which crosslink as elucidated above, it is possible very largely, or even entirely, to do without the use of typical crosslinking agents, especially melamine resins, and nevertheless to obtain outstanding performance properties, particularly an effective intercoat adhesion. This is all the more surprising in view of the fact that in principle the use of formaldehyde-containing melamine resins in pigmented coating compositions which are to be used, in particular, for the production of a multicoat paint system is considered very relevant, if not unavoidable. While the additional use of melamine resins may be appropriate in certain individual cases in the context of the present invention, it is nevertheless readily possible to lower the fraction of the melamine resins—a possibility which exists in principle—or even to do without them entirely.

Accordingly, the amount of melamine resins in the coating compositions of the invention is preferably less than 5 wt %, more preferably less than 3 wt %, especially preferably less than 1.5 wt %, based in each case on the total weight of the coating composition. With very particular preference the coating compositions of the invention are completely free from melamine resins.

It is even more preferable for the amount of formaldehyde-based amino resins to be generally less than 5 wt %, preferably less than 3 wt %, especially preferably less than 1.5 wt %, based in each case on the total weight of the coating composition. With very particular preference the coating compositions of the invention are entirely free from formaldehyde-based amino resins. Formaldehyde-based amino resins, as is known, are the group of resins which can be obtained by condensing formaldehyde and compounds having NH groups such as urea or melamine, or in whose preparation this condensation occurs. Melamine resins are therefore a subgroup of the formaldehyde-based amino resins.

It is even more preferred if additionally the fraction of isocyanate-containing crosslinkers in the coating composition of the invention is likewise below the limits identified above (5 wt %, 3 wt %, 1.5 wt %), or if the coating composition is additionally entirely free from isocyanate-containing crosslinkers.

In addition to the above-described thermal curing with external crosslinking, other curing mechanisms are of course not ruled out, as for example a proportional physical curing (that is, the curing of a layer of a coating composition by filming through loss of solvent from the coating composition, with the linking taking place within the coating via looping of the polymer molecules of the binders).

It is preferred, however, for the coating composition to be externally crosslinking at any rate, through the use of a hydroxy-functional polymer (B) as binder, more particularly a polyester (B), and at least one polymer (A).

The functionality of the polymers (B) in respect of the reactive functional groups described above may vary very widely and is guided in particular by the target crosslinking density. In the case of the preferred hydroxy-functional binders (B), for example, especially in the case of the preferred hydroxy-functional acrylate polymers, polyurethane polymers and/or polyesters, very preferably polyesters, the OH number is preferably 15 to 350, more preferably 40 to 325, very preferably 50 to 300, especially preferably 60 to 290, and more particularly 60 to 150 mg KOH/g according to DIN 53240.

Suitable binders (B), especially the acrylate polymers, polyurethane polymers and/or polyesters, very preferably polyesters, have a number-average molecular weight for example of 500 to 10 000 g/mol, but it may also be higher or lower, more particularly higher. The weight-average molecular weight is situated for example in the range from 2000 to 20 000 g/mol.

An acrylate polymer (B) may be included. Acrylate polymers are, as is known, also identified as (meth)acrylate (co)polymers. Suitable acrylate polymers may be prepared by the methods known to the skilled person, using the olefinically unsaturated monomers with reactive functional groups (especially hydroxyl groups) that are known in this context, generally in combination with monomers without reactive functional groups. In this context, reference may also be made to the above-described preparation of the copolymers (A).

The polyurethane polymers which can likewise be employed as polymers (B) are obtained, for example, in a manner known to the skilled person, by reaction of polyols such as polyester polyols and polyether polyols with a compound containing isocyanate-reactive functional groups. Polyurethane polymers of this kind are described in, for example, European patent applications EP 228003 and EP 574417.

Likewise suitable as polyurethane resins (B) are what are called acrylated polyurethane resins, which are obtainable conventionally by polymerizing ethylenically unsaturated monomers in the presence of a polyurethane resin. Here it is possible to use polyurethane resins without double bonds and/or polyurethane resins with double bonds.

Suitable acrylated polyurethane resins and corresponding graft copolymers are described in, for example, WO 01/25307, page 5, line 14 to page 45, line 4, and in EP-B-787 159, page 2, line 27 to page 7, line 13, respectively.

The polyesters which are likewise suitable as polymers (B) and are preferred in the context of the present invention may be saturated or unsaturated, especially saturated. Such polyesters and their preparation, and also the components which can be used in such preparation, are known to the skilled person and are described in EP-B-787 159, for example.

These are polymers prepared using polyhydric organic polyols and polybasic organic carboxylic acids. The polyols and polycarboxylic acids here are linked with one another by esterification, in other words by means of condensation reactions. Accordingly, the polyesters are generally assigned to the group of polycondensation resins. Depending on the nature, functionality, and fractions and proportions in which the starting components are used, the products obtained are, for example, linear or branched products. While linear products are formed primarily when difunctional starting components (diols, dicarboxylic acids) are used, the use of alcohols of higher functionality (OH functionality, i.e., number of OH groups per molecule, more than 2) has the effect, for example, of producing branching. Also possible for the preparation is, of course, the proportional use of monofunctional components, such as monocarboxylic acids, for example. For the preparation of polyesters it is possible to make use, as is known, instead of or in addition to the corresponding organic carboxylic acids, of the anhydrides of the carboxylic acids, more particularly the anhydrides of dicarboxylic acids. Preparation is likewise possible through the use of hydroxycarboxylic acids or of lactones derived from the hydroxycarboxylic acids by intramolecular esterification.

Suitable diols, alcohols of higher functionality (OH functionality more than 2), dicarboxylic acids or their anhydrides, or else hydroxycarboxylic acids, are known. The described preferred polymers (B) as binders, in other words the acrylate polymers, polyurethane polymers and/or polyesters, may be used individually or else in combination with one another in the coating composition of the invention.

Besides or instead of the acrylate polymers, polyurethane polymers and/or polyesters (B), further polymers may also be used as binders. Corresponding binders used commonly in the automobile industry sector in pigmented paints, especially basecoat materials, are known to the skilled person, who is easily able to select them.

Mention may be made, by way of example, of partially hydrolyzed polyvinyl esters, alkyds, polylactones, polycarbonates, polyethers, epoxy resin-amine adducts, polyureas, polyamides, polyimides, or else cellulose-based polymers such as cellulose acetobutyrates.

The amount of further binders (B), more particularly acrylate polymers, polyurethane polymers and/or polyesters, very preferably polyesters, is preferably 8 to 35 wt %, especially preferably 10 to 32.5 wt %, very preferably 12 to 30 wt %, and, in one particular embodiment, 15 to 28 wt %, based in each case on the total amount of the coating composition of the invention.

Polymer microparticles (M) may further be used, advantageously, in the coating compositions of the invention. Suitable polymer microparticles are described in, for example, EP-A-480 959, page 3, line 36 to page 4, line 35, in WO 96/24619, in WO 99/42529, and in EP-B-1 173 491, EP-B-1 185 568, WO 03/089487, WO 03/089477, WO 01/72909, and WO 99/42531. The polymer microparticles may be used in particular to control the flow, the evaporation behavior, and the incipient dissolution behavior by the clearcoat.

Suitable polymer microparticles customarily have a number-average molecular weight of 2000 to 100 000 g/mol. Determining the molecular weight is done by means of GPC analysis using THF (+0.1% acetic acid) as eluent (1 ml/min) on a styrene-divinylbenzene column combination. The calibration is performed using polystyrene standards.

Suitable polymer microparticles also customarily have an average particle size of 0.01 to 10 µm, more particularly of 0.01 to 5 µm, and very preferably of 0.02 to 2 µm, according to ISO 13320-1.

Polymer microparticles employed with particular preference have reactive functional groups which are able to react with the functional groups of crosslinking agents such as the copolymer (A). Here, in particular, the polymer microparticles have hydroxyl groups. In that case the polymer microparticles preferably have a hydroxyl number of 5 to 150 mg KOH/g according to DIN 53240. Hydroxyl-containing polymer microparticles are described in WO 01/72909, for example.

Crosslinked polymer microparticles are obtainable, for example, by polymerizing a mixture of:

(a) an ethylenically unsaturated monomer which contains one ethylenically unsaturated group per molecule, or a mixture of such monomers, and (b) an ethylenically unsaturated monomer which contains at least two ethylenically unsaturated groups per molecule, or a mixture of such monomers, in an aqueous phase, optionally in the presence of emulsifiers or optionally in the presence of a carrier resin, preferably a polyester, and subsequently transferring the aqueous polymer microparticle dispersion thus obtained into an organic solvent or a mixture of organic solvents.

Preference is given to polymer microparticles produced using components comprising ionic and/or polar groups, preferably hydroxyl groups and/or carboxyl groups. Components (a) and (b) ought generally to contain between 1 and 20 wt %, preferably between 3 and 15 wt %, of ionic and/or polar groups.

In order to obtain sufficiently crosslinked polymer microparticles, it is generally sufficient to use 0.25 to 1.2 mol, preferably 0.3 to 1 mol, of component (b) per mole of component (a).

However, the polymer microparticles (M) used in the coating compositions may also be prepared directly in organic phase.

Polymer microparticles employed with preference are obtainable, for example, by subjecting a mixture of:

(c) an ethylenically unsaturated monomer (M1) which comprises at least one reactive group (G1) per molecule, or a mixture of such monomers (M1), and (d) optionally an ethylenically unsaturated monomer (M2) which comprises at least one reactive group (G2), different from (G1), per molecule, or a mixture of such monomers (M2), and (e) optionally a further ethylenically unsaturated monomer (M3), or a mixture of such monomers (M3), to polymerization in an organic solvent, optionally in the presence of a carrier resin, preferably a polyester.

Examples of suitable monomers (M1) are monomers which as reactive groups contain hydroxyl groups, carbamate groups, amino groups, alkoxymethylamino groups, allophanate groups, or imino groups, especially hydroxyl groups.

The monomers (M1) with the reactive groups (G1) may also be prepared by reaction of two compounds, of which a first compound has one reactive group and at least one ethylenically unsaturated double bond, and the other compound has a group reactive with the reactive groups of the first compound, and optionally an ethylenically unsaturated double bond.

Examples of suitable monomers (M2) are monomers which contain carboxyl groups.

Suitable monomers (M3) are the so-called neutral monomers that are commonly employed, these being ethylenically unsaturated monomers which have no reactive groups.

It follows from the above that the polymeric microparticles are also polymers, which may likewise contribute to film formation, more particularly through external crosslinking with the copolymers (A). Accordingly, they are likewise binder components. For the purposes of the present invention, however, they are considered separately from the binders (B), on account of the particulate character that is present at any rate, more particularly the particle sizes measurable as described above. This of course does not rule out the possibility of the binders (B) forming aggregated particles and/or microparticles in certain solvents.

The polymer microparticles (M) may be used in the coating compositions of the invention in an amount, for example, of 2 to 30 wt %, more particularly of 3 to 20 wt %, based in each case on the total weight of the coating composition.

Besides the components described above, the coating composition of the invention may comprise customary and known auxiliaries and adjuvants in customary amounts, preferably 0.5 to 40 wt % and more preferably 0.5 to 30 wt %, more particularly 0.5 to 15 wt %, based in each case on the total weight of the respective coating composition.

Examples of suitable auxiliaries and adjuvants are organic and inorganic fillers, examples being talc or fumed silicas, and/or other customary auxiliaries and adjuvants, such as, for example, antioxidants, deaerating agents, wetting agents, catalysts, dispersants, emulsifiers, rheological assistants such as flow control agents, thickeners, antisag agents, and thixotropic agents, waxes, slip additives, reactive diluents, flow aids, siccatives, biocides, additives for improving substrate wetting, additives for improving surface smoothness, matting agents, radical scavengers, light stabilizers, preferably the above-described UV absorbers with an absorption maximum below 370 nm and/or HALS, corrosion inhibitors, flame retardants, or polymerization inhibitors, as described in detail in the book "Lackadditive" [Additives for coatings] by Johan Bieleman, Wiley-VCH, Weinheim, New York, 1998. Examples of catalysts which can be used are typical phosphorus-based catalysts known for the crosslinking of silane groups, such as the catalysts described in WO 2008/074489 A1, page 6, line 7 to page 9, line 24, for example. Preferred auxiliaries and adjuvants are rheological assistants, deaerating agents, wetting agents, dispersants, UV absorbers, and radical scavengers. Particularly preferred auxiliaries and adjuvants are UV absorbers and wetting agents and also fillers, among which fumed silicas are preferred.

The solids content (also called solids fraction) of the coating composition is at least 35%, preferably 35% to 60%, more preferably up to 55%, more particularly up to 50%, and very advantageously up to 45%. Particularly preferred ranges are from 37% to 60%, more particularly 37% to 55%, very preferably 37% to 50%, and especially advantageously 37% to 45%.

In the context of the present invention, unless otherwise indicated, the solids content is determined according to DIN EN ISO 3251 with an initial sample mass of 1.0 g, as for example 1.0 g of the coating composition of the invention, with a test duration of 60 minutes and at a temperature of 125° C.

This method of testing is likewise employed in order to specify, for example, the fraction of different components of the coating composition in the overall composition. Thus, for example, the solids content of a binder dispersion of a polymer (B) which is added to the coating composition may be determined correspondingly, in order to specify the fraction of this polymer (B) in the overall composition.

Under the stated conditions, in other words with the stated solids contents, preferred pigmented coating compositions of the invention have a viscosity at 23° C. of 16 s to 35 s and more preferably 20 to 28 s as the flow time in the Ford 3 Cup. In the context of the present invention, a viscosity within this range is identified as spray viscosity (processing viscosity). As is known, coating compositions are applied at spray viscosity, meaning that under the conditions then prevailing they have a viscosity which in particular is not too high, so as to permit effective application. Consequently, the setting of the spray viscosity is important in order for a coating material to be able to be applied at all by spray methods, and in order to ensure that a complete, uniform film of coating is able to form on the substrate that is to be coated.

Besides the coating composition of the invention, further coating compositions are used in producing multicoat paint systems of the invention.

As indicated above, for production of the multicoat paint system of the invention, the coating composition of the invention is employed as basecoat material and then a clearcoat material is applied to the basecoat film, preferably to the as yet uncured basecoat film (wet on wet). In this way, the multicoat paint system of the invention is then obtained, comprising at least one basecoat and at least one clearcoat.

Suitable transparent coating compositions are described in WO 03/050194 A1, in US 2008/076868 A1, and in WO 06/063304 A1, for example.

The further coating compositions, more particularly primers and surfacers, that may likewise be employed for producing the multicoat paint system of the invention are the coating compositions that are known in this context to the skilled person, examples being coating compositions available commercially.

Examples

1. Preparation of Inventive and Comparative Basecoat Materials

Inventive basecoat materials and comparative basecoat materials, and also components included therein, were prepared as follows:

1.1 Preparation of a Polyester (B) as Binder

A 2 L four-neck flask with stirrer, electrical resistance heater, thermometer, packed column filled with Pall rings, equipped with overhead thermometer, distillation bridge, condensate condenser, and receiver, is charged with 81.0 parts by weight of 1,6-hexanediol, 108.0 parts by weight of neopentyl glycol, 28.0 parts by weight of glycerol, 38.0 parts by weight of trimethylolpropane, 99.0 parts by weight of adipic acid, 157.0 parts by weight of phthalic anhydride, and 125.0 parts by weight of isophthalic acid. The reaction mixture is heated rapidly to 160° C. with stirring and held at 160° C. for 30 minutes. From 160° C., the temperature is raised to 190° C. over the course of 1.5 hours at a rate such that the overhead column temperature does not exceed 103° C. This is followed by cooling to 150° C., addition of 63.0 parts by weight of Cardura E 10 P and 7.0 parts by weight of xylene, and subsequent heating, the batch being held at 165° C. for an hour. It is then heated to 230° C. and held at 230° C. until the acid number falls below a figure of 10 mg KOH/g (measured according to DIN EN ISO 2114:2002-06). The epoxy-modified polyester is cooled further and diluted with a mixture of 238.0 parts by weight of solvent naphtha 155/185, 24.0 parts by weight of 1-methoxipropyl acetate, and 35.0 parts by weight of ethyl ethoxypropionate. This gives a 65% strength binder solution (solids content). The epoxy-modified polyester thus obtained has an acid number of 10 mg KOH/g and an OH number of 106 mg KOH/g, in each case based on the solids content. The weight-average molecular weight is 8600 g/mol.

1.2 Production of Polymeric Microparticles

First of all a carrier resin is prepared: a reactor is charged with 5.762 parts by weight of xylene, 5.762 parts by weight of toluene, 0.179 part by weight of methanesulfonic acid, and heated to 104° C. Then 80.615 parts by weight of 12-hydroxystearic acid are run into the reactor, and the mixture is boiled at reflux at 171° C. with removal of the water of reaction. The reaction is at an end when an acid number of 35 is reached. After cooling, the solids content is adjusted with solvent naphtha to 80 parts by weight.

Then the actual polymeric microparticles are produced: a reactor is charged with 43.2 parts by weight of solvent naphtha, 0.08 part by weight of N,N-dimethylcocoamine, and 1.0 part by weight of ethyl acetate and this initial charge is heated to 104° C. The reactor is placed under a pressure of 0.69 bar and charged over the course of 2 hours, simultaneously, with a monomer mixture consisting of 27.6 parts by weight of methyl methacrylate, 3.8 parts by weight of 2-hydroxypropyl methacrylate, 0.8 part by weight of glycidyl methacrylate, 12.8 parts by weight of the above-described carrier resin, 1.5 parts by weight of methacrylic acid, and 1.5 parts by weight of octyl mercaptane, and with an initiator mixture consisting of 2.3 parts by weight of tert-butyl peroxy-2-ethylhexanoate and 5.1 parts by weight of solvent naphtha. The aforementioned temperature and pressure are then maintained for 3 hours, after which cooling takes place and a solids content of 31.0% is established using solvent naphtha.

1.3 Production of a Wax Dispersion 6.00 parts by weight of the polyethylene wax EVA 1 from BASF AG (i.e., commercially customary polyethylene wax based on an ethylene/vinyl acetate copolymer, with a melting point of 87-92° C., an Ubbelohde dropping point of about 95° C., and a mass-average molecular weight (from viscometry) of around 6500 g/mol) and 40.00 parts by weight of xylene are dissolved with slow stirring at 100° C. With further stirring, the solution is cooled to 70° C. and 54.00 parts by weight of butyl acetate (technical grade, approximately 85% pure) are slowly added, whereupon desired precipitation of wax commences. With continued stirring, the dispersion is cooled further down to 35° C.

1.4 Preparation of a Solution of Cellulose Acetic Butyrate (CAB)

In a receiver vessel, 85.0 parts by weight of butyl acetate are mixed for 30 minutes with 15.0 parts by weight of CAB 551-0.2 (commercial cellulose acetic butyrate from Eastman).

1.5 Preparation of a Copolymer (A)

A reactor is charged with 515.5 parts by weight of Shellsol A and this initial charge is heated to 145° C. The reactor is placed under pressure (3.5 bar). Thereafter, over a period of 4.75 hours, an initiator solution (96 parts by weight of di-tert-butyl peroxide in 98.7 parts by weight of Shellsol A) is metered in at a uniform rate with stirring and, over a period of 4.25 hours, a monomer mixture consisting of 899.0 parts by weight of methyl methacrylate, 899.0 parts by weight of n-butyl acrylate, and 449.4 parts by weight of Geniosil XL 10 (from Wacker) (vinyltrimethoxysilane) is metered in at a uniform rate with stirring. The feed of the initiator solution is commenced at 0.25 h before the feed of the monomer mixture. Following complete addition of the initiator solution (0.25 h after the end of the addition of the monomer mixture), stirring is continued for 10 minutes at the stated temperature and stated pressure, before a solution consisting of 17.1 parts by weight of di-tert-butyl peroxide in 25.3 parts by weight of Shellsol A is again added at a uniform rate over the course of 20 minutes. Subsequently, the batch is held at the stated temperature and stated pressure for a further 3 hours. Thereafter the reaction mixture is cooled to 60° C. and let down to atmospheric pressure. The solids content of the resulting solution of a copolymer (A) is 76.5%. The copolymer (A) possesses a number-average molecular weight of 1781 g/mol and a weight-average molecular weight of 5530 g/mol. The glass transition temperature of the copolymer (A) is −4° C.

To produce an inventive basecoat material 1 (I-1) and the comparative basecoat materials C-1 and C-2, the components listed in table 1 were mixed in the stated amounts (parts by weight) and the resulting mixture was homogenized. In order to set the application viscosity (spray viscosity), a further addition of butyl acetate was made in each case. Table 1 also shows the solids contents (SC), the pigment content (PC), the organic solvents content (OS), and the binder content (BC) of the components used, and also the solids content and the viscosity of the resultant basecoat materials.

TABLE 1

Compositions and characteristic data of basecoat materials I-1, C-1 and C-2

|  | SC (%) | BC (%) | OS (%) | PC (%) | C-1 | C-2 | I-1 |
|---|---|---|---|---|---|---|---|
| Wax dispersion (1.3) | 6 | 6 | 94 | 0 | 6.0 | 6.0 | 6.0 |
| Polymeric microparticles (1.2) | 31 | 31 | 69 | 0 | 28.0 | 26.0 | 26.0 |
| Maprenal MF650 | 55 | 55 | 45 | 0 | 12.0 | 0 | 0 |
| Solution of copolymer (A) (1.5) | 76.5 | 76.5 | 23.5 | 0 | 0.0 | 0.0 | 0.3 |
| Catalyst | 33.3 | 33.3 | 66.7 | 0 | 1.0 | 1.0 | 0 |
| Butyl acetate | 0 | 0 | 100 | 0 | 7.0 | 5.0 | 4.0 |
| Polyester (1.1) | 65 | 65 | 35 | 0 | 23.0 | 39.0 | 39.0 |
| Butyl acetate | 0 | 0 | 100 | 0 | 10.0 | 10.0 | 10.0 |
| Aluminum pigment | 70 | 0 | 30 | 70 | 7.0 | 7.0 | 7.0 |
| Butyl acetate | 0 | 0 | 100 | 0 | 6.0 | 7.0 | 6.7 |
| Total [%] |  |  |  |  | 100 | 100.0 | 100.0 |
| Solids content [%] |  |  |  |  | 40.1 | 39.4 | 39.3 |
| Initial viscosity (Ford 3 Cup, 23° C.) |  |  |  |  | 31 | 31 | 31 |
| Addition of butyl acetate |  |  |  |  | 5 | 15 | 5 |
| Solids content on application [%] |  |  |  |  | 39.0 | 39.0 | 39.0 |
| Application viscosity (Ford 3 Cup, 23° C.) |  |  |  |  | 25 | 26 | 25 |

Maprenal MF650: Melamine resin in isobutanol, from Ineos
Aluminum pigment: Stapa Metallux 2192, from Eckart All basecoat materials possess a solids content of 39.0% and have a viscosity at 23° C. of 25 or 26 s flow time in the Ford 3 Cup (spray viscosity).

Whereas the comparative basecoat material C-1 still comprises a formaldehyde-based melamine resin as crosslinker, this crosslinker is entirely absent from the comparative basecoat material C-2. Both basecoat materials C-1 and C-2 contain no copolymer (A). Based on the total amount of the coating composition at application viscosity, the inventive basecoat material I-1 contains 0.22 wt % of copolymer (A) and is also entirely free from melamine resins.

By varying the proportion of the copolymer (A), two further inventive basecoat materials and two further comparative basecoat materials were produced. In this case the varied addition of the copolymer (A) was compensated by correspondingly varied addition of butyl acetate at the third addition of butyl acetate (in the case of I-1, this was 6.7 parts by weight) (total of 100 parts by weight at initial viscosity). By addition of a further 5 parts by weight of butyl acetate, all the basecoat materials were adjusted to an application viscosity of 26 s (Ford 3 Cup 23° C.). Basecoat materials I-2 and I-3 had a solids content of 39% at application viscosity. Basecoat materials C-3 and C-4 had a solids content of 37% and 35%, respectively.

Table 2 provides an overview. Basecoat material I-1 is listed again for greater ease of comprehension. Also specified is the respective proportion of copolymer (A), based on the total amount of the respective basecoat material (at application viscosity).

TABLE 2

|  | I-1 | I-2 | I-3 | C-3 | C-4 |
|---|---|---|---|---|---|
| Solution of copolymer (A) (1.5) | 0.3 | 0.5 | 1.0 | 2.5 | 5.0 |
| Amount of copolymer (A) (wt %) | 0.22 | 0.36 | 0.73 | 1.8 | 3.5 |

2. Production of Comparative and Inventive Multicoat Paint Systems

For the testing of performance properties, multicoat paint systems were first of all produced in a customary and known way, on test panels with dimensions of 30×20 cm, using the basecoat materials described under 1.

For this purpose, cathodically electrocoated steel test panels were coated with a conventional commercial gray, polyester-based surfacer from BASF Coatings AG, after which the resultant surfacer films were flashed at 20° and a relative humidity of 65% for 5 minutes and baked in a forced air oven at a substrate temperature of 165° C. for 5 minutes.

After the test panels were cooled to 20° C., the basecoat materials were applied by automated ESTA spraying, giving a dry film thickness, after the subsequent curing, of 17-19 micrometers. After that the basecoat films were flashed for 5 minutes and coated with a solventborne one-component clearcoat material from BASF Coatings GmbH, giving a dry film thickness, after the subsequent curing, of 37-39 micrometers. After that, flashing took place over a rest time of 5 minutes, after which the basecoat films and the clearcoat films applied over them were jointly baked at a substrate temperature of 140° C. for 20 minutes. This gave comparative and inventive multicoat paint systems.

Table 3 provides an overview of the multicoat paint systems M produced and of the basecoat materials used in producing the multicoat paint systems. Also stated is the respective amount of the copolymer (A), based in each case on the total amount of the respective basecoat material.

TABLE 3

| | Multicoat paint system | | | | | | |
|---|---|---|---|---|---|---|---|
|  | MC-1 | MC-2 | MI-1 | MI-2 | MI-3 | MC-3 | MC-4 |
| Basecoat material | C-1 | C-2 | I-1 | I-2 | I-3 | C-3 | C-4 |
| Amount of (A) (wt %) | — | — | 0.22 | 0.36 | 0.73 | 1.8 | 3.5 |

Besides the multicoat paint systems described, different refinish systems were produced for the purpose of investigating the performance properties. For this purpose, the multicoat paint systems as described above were abraded with abrasive paper and again, by means of automated ESTA spray application, the basecoat materials C-1 to C-4 and I-1 to 1-7 were applied such that the subsequent curing gave a dry film thickness of 17-19 micrometers. The basecoat films were then flashed for 5 minutes and coated with a solventborne one-component clearcoat material from BASF Coatings GmbH, giving a dry film thickness, after the subsequent curing, of 37-39 micrometers. Thereafter the basecoat films and the clearcoat films were baked at a substrate temperature of 140° C. for 20 minutes. This gave comparative and inventive multicoat paint systems.

Table 4 provides an overview of the refinish multicoat paint systems RM produced and of the basecoat materials used in producing the refinish multicoat paint systems. Also stated is the respective amount of the copolymer (A), based in each case on the total amount of the respective basecoat material.

TABLE 4

| | Refinish multicoat paint system | | | | | | |
|---|---|---|---|---|---|---|---|
| | RMC-1 | RMC-2 | RMI-1 | RMI-2 | RMI-3 | RMC-3 | RMC-4 |
| Basecoat material | C-1 | C-2 | I-1 | I-2 | I-3 | C-3 | C-4 |
| Amount of (A) (wt %) | — | — | 0.22 | 0.36 | 0.73 | 1.8 | 3.5 |

3. Performance Investigation

The intercoat adhesion of the multicoat and refinish multicoat paint systems produced by the method specified in section 2. was tested by the cross-cut test in accordance with Ford test method BI 106-01. The evaluation scale for the cross-cut testing according to Ford test method BI 106-01 embraces a range of 0-10, with a score of more than 2 pointing to a potential adhesion problem.

The stonechip resistance of the multicoat and refinish multicoat paint systems described in section 2. was tested according to Ford test method BI 157-06. The evaluation scale for the stonechip testing according to Ford test method BI 157-06 encompasses a range of 1-10, with a score of less than 4 pointing to a potential adhesion problem.

Table 5 shows the performance results obtained.

TABLE 5

| | Multicoat paint system | | | | | | |
|---|---|---|---|---|---|---|---|
| | MC-1 | MC-2 | MI-1 | MI-2 | MI-3 | MC-3 | MC-4 |
| Basecoat material | C-1 | C-2 | I-1 | I-2 | I-3 | C-3 | C-4 |
| Amount of (A) (wt %) | — | — | 0.22 | 0.36 | 0.73 | 1.8 | 3.5 |
| Cross-cut | 0 | 2 | 2 | 0 | 0 | 3 | 4 |
| Stonechip | 7 | 5 | 8 | 8 | 8 | 1 | 1 |

| | Refinish multicoat paint system | | | | | | |
|---|---|---|---|---|---|---|---|
| | RMC-1 | RMC-2 | RMI-1 | RMI-2 | RMI-3 | RMC-3 | RMC-4 |
| Basecoat material | C-1 | C-2 | I-1 | I-2 | I-3 | C-3 | C-4 |
| Amount of (A) (wt %) | — | — | 0.22 | 0.36 | 0.73 | 1.8 | 3.5 |
| Cross-cut | 0 | 2 | 0 | 0 | 0 | 2 | 3 |
| Stonechip | 5 | 3 | 6 | 6 | 6 | 1 | 1 |

Whereas the systems MC-1 and RMC-1 (containing melamine resin) exhibit good performance properties, but are greatly in need of improvement from an environmental standpoint, owing to the formaldehyde-containing melamine resin they contain, the performance properties in the case of systems MC-2 and RMC-2 (no melamine resin, no copolymer (A)) show evidence of distinct disadvantages. The refinish system in particular has a slightly reduced intercoat adhesion and a stonechip resistance that is no longer acceptable. Simply the slight addition of a copolymer (A), in spite of the absence of a melamine resin, results in improved performance properties, giving the coating systems the ability to meet the requirements again. Notably, the stated properties are impaired again when fractions of the copolymer (A) are too high. Stonechip resistance and intercoat adhesion in systems RMC-3 and RMC-4 are no longer acceptable.

The overall picture is that, through the use of specifically tailored amounts of the copolymer (A) in pigmented coating compositions, coating systems are obtainable which in spite of the absence of melamine resins exhibit outstanding performance properties, which are equivalent to the properties of systems containing melamine.

4. Preparation of Further Copolymers and their Investigation

Further copolymers based on olefinically unsaturated monomers (a) were prepared and investigated.

The further copolymers were prepared in analogy to the preparation of a copolymer (A) as described above in section 1.5, but with certain changes in the synthesis. Table 6 identifies further copolymers based on olefinically unsaturated monomers (a) and also describes the changes in comparison to the copolymer (A) described under section 1.5. Additionally stated is the glass transition temperature of the further copolymers.

TABLE 6

| | Fraction of vinyltrimethoxy-silane (based on the monomers (a)) | Fraction of styrene (based on the monomers (a)) | Glass transition temperature $T_g$ in ° C. |
|---|---|---|---|
| Copolymer (A) (from 1.5) | 16 mol % | — | −4 |
| Copolymer (comparative) | 8 mol %[1] | — | −9 |
| Copolymer (A.b) | 32 mol %[1] | — | −5 |
| Copolymer (A.c) | 48 mol %[1] | — | −4 |
| Copolymer (A.d) | 16 mol % | 5.6 mol %[2] | −2 |
| Copolymer (A.e) | 16 mol % | 22.7 mol %[2] | −0 |

TABLE 6-continued

|  | Fraction of vinyltrimethoxy-silane (based on the monomers (a)) | Fraction of styrene (based on the monomers (a)) | Glass transition temperature $T_g$ in ° C. |
|---|---|---|---|
| Copolymer (A.f) | 16 mol % | 45.4 mol %[2] | −7 |

[1]The varied fraction of vinyltrimethoxysilane was compensated by increasing or lowering the fractions of the methyl methacrylate and n-butyl acrylate monomers (ratio 1:1). For example, then, in preparing the copolymer (A.b), 4 mol % more methyl methacrylate and 4 mol % more n-butyl acrylate were used by comparison with the preparation of copolymer (A).
[2]The addition of styrene as monomer was compensated by lowering the fraction of methyl methacrylate accordingly.

The copolymers (A), (comparative) and also (A.b) and (A.c) were investigated for their compatibility with components of basecoat materials. For this purpose, mixtures of these copolymers (as solutions with a solids content of 76.5%) were mixed with the polyester (B) (see section 1.1, solids content of 65%) in a standing glass cylinder (weight ratios, based on solids content, of 1/4 and 1/1). These mixtures were left to stand for 5 days, then drawn down onto a glass plate and cured at 140° C. for 20 minutes. Visual evaluation was made according to the following criteria:

(o)="clear film" (no incompatibility)

(-)="film with milky haze" (slight incompatibility)

(x)="gel specks, hazy film" (incompatibility)

Table 7 shows the results.

TABLE 7

|  | Mixture with polyester (B) (section 1.1) 1/4 | Mixture with polyester (B) (section 1.1) 1/1 |
|---|---|---|
| Copolymer (A) (from 1.5) | (o) | (o) |
| Copolymer (comparative) | (o) | (o) |
| Copolymer (A.b) | (o) | (o) |
| Copolymer (A.c) | (—) | (x) |

The results show that the particularly preferred inventive copolymers which have a fraction of less than 35 mol % of vinyl trimethoxysilane have the additional advantage of optimum compatibility.

The copolymers stated in table 6 were additionally investigated for their residual monomer content (molar fraction of monomer in comparison to the amount of monomer used originally during preparation). The analysis took place by gas chromatography.

For this purpose, first of all, a sample of the respective solution of a copolymer, directly after preparation, was cooled to 25° C. and admixed with hydroquinone monomethyl ether as inhibitor. In the next step, the sample is dissolved in tetrahydrofuran, n-pentane is added, and the mixture is centrifuged. The clear supernatant is analyzed by gas chromatography (25 m silica capillary column with 5% phenyl-, 1% vinyl-methylpolysiloxane phase, carrier gas hydrogen, split injector 150° C., oven temperature 50 to 180° C., flame ionization detector, detector temperature 275° C., internal standard isobutyl acrylate). The results are shown in table 8.

TABLE 8

|  | Fraction of residual monomer methyl methacrylate | Fraction of residual monomer n-butyl acrylate | Fraction of residual monomer styrene | Fraction of residual monomer vinyl-trimethoxy-silane |
|---|---|---|---|---|
| Copolymer (A) (from 1.5) | n.d.[1] | n.d.[1] | n.a.[2] | 0.6% |
| Copolymer (comparative) | n.d.[1] | n.d.[1] | n.a.[2] | 0.3% |
| Copolymer (A.b) | n.d.[1] | n.d.[1] | n.a.[2] | 0.4% |
| Copolymer (A.c) | n.d.[1] | n.d.[1] | n.a.[2] | 0.4% |
| Copolymer (A.d) | n.d.[1] | n.d.[1] | n.d.[1] | 1.6% |
| Copolymer (A.e) | n.d.[1] | n.d.[1] | n.d.[1] | 3.2% |
| Copolymer (A.f) | n.d.[1] | n.d.[1] | n.d.[1] | 4.5% |

[1]not detectable
[2]not applicable

The results show that the advantageous versions of the inventive copolymers (A), these being the copolymers (A) which contain little or no fractions of aromatic structural units (compare the amount of styrene used), comprise significantly lower fractions of the residual monomer vinyltrimethoxysilane. The preferred variants of copolymers (A) therefore have the additional advantage that difficult-to-control migration events, incompatibilities and/or hazards to health as a result, for example, of monomers given off in the course of storage or curing of coating compositions are minimized.

What is claimed is:

1. A method for producing a multicoat paint system, the method comprising:
    (1) applying at least one basecoat material to a substrate,
    (2) forming a polymer film from the basecoat material applied, thereby obtaining a basecoat film,
    (3) applying at least one clearcoat material to the basecoat film, and then
    (4) curing the basecoat film together with the clearcoat material, thereby obtaining the multicoat paint system,
    wherein the basecoat material is a solventborne, pigmented coating composition having a solids fraction of at least 35%, which comprises, based on the total amount of the coating composition, 0.1 to 1.5 wt % of copolymer (A), and a polyester having an OH number of 15-350 mg KOH/g as binder (B),
    wherein the copolymer (A) is obtained by copolymerization of a mixture of olefinically unsaturated monomers (a) in at least one organic solvent, wherein the mixture of monomers (a) consists of
    (a1) 10-20 mol % of at least one monomer of the formula (I)

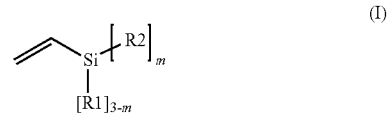

(I)

wherein $R_1$ is a $C_1$ to $C_4$ alkoxy group, $R_2$ is a $C_1$ to $C_4$ alkyl group, and m is 0 to 2, and also
    (a2) 80-90 mol % of at least one further olefinically unsaturated monomer selected from the group consisting of monomers of the formulae H$_2$C=CH—(C=O)—O—R$_x$, H$_2$C=CH—(CH$_3$)—(C=O)—O—R, and H$_2$C=CH—O—(C=O)—R, where R$_x$ is an alkyl radical having 1 to 20 carbon atoms, wherein the copolymer (A) has a glass transition temperature T, of at least −30'C, and wherein the clearcoat film is a topmost film of the multicoat paint system.

2. The method as claimed in claim 1, further comprising, before the basecoat material is applied, first applying at least one primer and then at least one surfacer to the substrate.

3. The method as claimed in claim 1, wherein the substrate is a metallic substrate or a plastic substrate.

4. The method as claimed in claim 1, wherein the substrate from stage (1) is a multicoat paint system which possesses defect sites.

5. A multicoat paint system obtained by the method of claim 1.

6. The method of claim 1, wherein the solventborne pigmented coating composition has a formaldehyde-based amino resin content, if present, of less than 5 wt %.

7. The method of claim 1, wherein the solventborne pigmented coating composition does not comprise a formaldehyde-based amino resin.

8. The method of claim 1, wherein the solventborne pigmented coating composition has an organic solvent content of not more than 65 wt %.

9. The method of claim 1, wherein the multicoat paint system has a score of at most 2 in a cross-cut test according to Ford test method BI 106-01, and wherein the multicoat paint system has a score of at least 4 in a stonechip test according to Ford test method BI 157-06.

10. The method as claimed in claim 1, wherein the solventborne pigmented coating composition further comprises as pigment at least one aluminum flake pigment.

11. The method as claimed in claim 1, wherein the fraction of the at least one copolymer (A), based on the total amount of the coating composition, is from 0.2 to 1.0 wt %.

12. The method as claimed in claim 1, wherein the at least one copolymer (A) has a glass transition temperature T$_g$ of −25 to 50° C.

* * * * *

UNITED STATES PATENT AND TRADEMARK OFFICE
CERTIFICATE OF CORRECTION

PATENT NO. : 10,465,088 B2
APPLICATION NO. : 15/528269
DATED : November 5, 2019
INVENTOR(S) : Andreas Poppe et al.

It is certified that error appears in the above-identified patent and that said Letters Patent is hereby corrected as shown below:

In the Specification

Column 13, Line 31, "naptha" should read --naphtha--.

Column 23, Line 45, "1-methoxipropyl" should read --1-methoxypropyl--.

In the Claims

Column 31, Line 5, Claim 1, "T," should read --$T_g$--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*